(12) United States Patent
Zember et al.

(10) Patent No.: US 8,716,370 B2
(45) Date of Patent: May 6, 2014

(54) ROOF SLOPING COMPOUND

(75) Inventors: Jeffrey D. Zember, Murrieta, CA (US); Jan C. Bagnall, Murrieta, CA (US)

(73) Assignee: PLI-DEK, Inc., Murrieta, CA (US)

( * ) Notice: Subject to any disclaimer, the term of this patent is extended or adjusted under 35 U.S.C. 154(b) by 89 days.

(21) Appl. No.: 13/457,424

(22) Filed: Apr. 26, 2012

(65) Prior Publication Data

US 2013/0289168 A1  Oct. 31, 2013

(51) Int. Cl.
*C08K 3/26* (2006.01)

(52) U.S. Cl.
USPC ............ 524/5; 524/2; 524/3; 524/8; 524/238; 524/431; 524/376

(58) Field of Classification Search
USPC .......................... 524/2, 3, 5, 8, 238, 431, 376
See application file for complete search history.

(56) References Cited

U.S. PATENT DOCUMENTS

| | | | |
|---|---|---|---|
| 2009/0085253 A1* | 4/2009 | Kruss | 264/333 |
| 2011/0104377 A1* | 5/2011 | Zapf et al. | 427/385.5 |
| 2011/0306705 A1* | 12/2011 | Dombrowski et al. | 524/5 |

* cited by examiner

*Primary Examiner* — Robert D. Harlan
(74) *Attorney, Agent, or Firm* — Holland & Knight LLP; Richard E. Lyon, Jr.

(57) ABSTRACT

A roof sloping compound for creating an auxiliary slope over a wide variety of roof membranes and substrates. The compound includes a dry mixture of aggregate, cement and a redispersible dry polymer adapted to be mixed with water to define a substantially self-leveling consistency enabling the compound to be readily screeded into place in a desired thickness. The aggregate comprises dolomite or limestone and the redispersible dry polymer can comprise a binder based on a copolymer of ethylene vinyl acetate. In a lightweight embodiment of the compound, the aggregate includes lightweight fillers comprising perlite and low density glass granules and a superplasticizer is added to the dry mixture to reduce water demand.

10 Claims, No Drawings

ROOF SLOPING COMPOUND

BACKGROUND OF THE INVENTION

The present invention relates to a cementitious sloping material designed to create an auxiliary slope over existing composition and rolled roofing products to divert water to drains, scuppers or an outside edge to aid in proper drainage and to fill low spots in flat roofs. The sloping compound of the present invention will adhere to a wide variety of roofing products and is well suited for new construction as well as retrofit work to minimize costly removal and/or additional framing expenses typically required to remedy slope-to-drain issues.

While other products have been developed for such purposes, they are typically modified asphalt emulsions and suffer from a number of drawbacks, particularly, the failure to provide a standalone application. As a result, the use of such emulsions typically require additional work to be done over the newly created slope for waterproofing and other purposes, thus increasing the cost of the installation and substantially delaying production. In addition to providing a standalone application, the compound of the present invention provides substantially increased compressive strength, bond strength, durability, and Ultra Violet Ray stability and a diverse range of compatibility with a variety of substrates. The compound of the present invention also provides the ability to readily match the appearance of the existing roof and can be installed prior to the instillation of the roofing membrane in a one step, easy to install application. A modified embodiment of the present invention significantly reduces the weight of the compound which is particularly useful in applications in which significant material is required and the assembly requires a lightweight alternative.

DETAILED DESCRIPTION OF THE PREFERRED EMBODIMENTS

The sloping compound of the present invention comprises a dry mixture of aggregate, cement and a redispersible dry polymer that is mixed with water to a self-leveling consistency, enabling the resultant compound to be readily screeded into place in a desired thickness/slope. Prior to cure, crushed rock or other desired granule is preferably broadcast into the wet slope mix until refusal to provide the cured coating with the desired texture and color.

The aggregate used in the present invention comprises dolomite (calcium magnesium carbonate) or limestone (calcium carbonate). In a preferred embodiment, the calcium magnesium carbonate is Vical 1830 marketed by Specialty Minerals, Inc. of Bethlehem, Pa. VICAL is a federally registered trademark of Specialty Minerals, Inc. In Vical 1830, the granules have a top size of 20 mesh. The cement preferably used in the preferred embodiment of the sloping compound of the present invention is OPC (Ordinary Portland Cement), preferably type 1-2 gray, and the redispersible dry polymer is a binder based on a copolymer of ethylene vinyl acetate (EVA), preferably having a glass transition temperature (Tg) of about +5° C. to +15° C.

In the preferred embodiment of the dry mixture, the dolomite or limestone comprises between about 55% and 60% thereof by weight. The cement comprises between about 35% and 40% of the dry mixture by weight and the redispersible dry polymer between about 3.5% and 4.5% by weight. Most preferably, the formulation of the dry mixture is as follows:

| | |
|---|---|
| Portland Cement | 38% |
| Dolomite/Limestone | 58% |
| Redispersible dry polymer | 4% |
| Total | 100% |

Thus, in a 50-pound bag of the dry mixture, the dolomite or limestone weighs about 29 pounds; the cement weighs about 19 pounds and the redispersible dry polymer weighs about 2 pounds.

In a modified lightweight embodiment of the present invention, the percentage by weight of dolomite or limestone in the dry mixture is reduced to between about 32% and 38% and the percentage of cement therein is raised to about 40% and 50%, respectively. The percentage of redispersible dry polymer is reduced to between about 3% and 3.5% by weight and lightweight fillers and a superplasticizer have been added to the dry mixture. The dolomite or limestone, redispersible dry polymer and cement used in the lightweight embodiment of the dry mixture remain unchanged from the previously disclosed embodiment of the present invention. The newly added lightweight fillers comprise perlite and low density, preferably spherical, glass granules. The superplasticizer is employed in the lightweight embodiment primarily to reduce the water demand in the formula without sacrificing performance. Reduced water in the formulation speeds up the drying and strength development.

The first lightweight filler, perlite, is a volcanic glass in which concentric fractures impart a distinctive structure resembling masses of small spheroids. Perlite is produced from perlite ore which is a highly siliceous volcanic ash containing from about 2-5% combined water. When rapidly heated to the proper temperature, the volatilization of the water, coincident with the softening of the glass, causes the perlite to suddenly expand into lightweight cellular particles or bubbles. The bubbles provide the expanded perlite its excellent insulating properties and light weight. The perlite preferably used in the present invention is marketed by World Minerals, Inc., located in Santa Barbara, Calif., under the trademark HARBORLITE®. HARBORLITE® is a federally registered trademark of Harborlite Corporation of Santa Barbara, Calif. The preferred glass granules used as a second lightweight filler in the lightweight dry mixture are marketed under the federally registered trademark PORAVER by Dennert Poraver GmbH located in the Federal Republic of Germany. The PORAVER brand granules are made from recycled glass and are alkali resistant. The perlite comprises between about 10% and 12% of the lightweight dry mixture by weight and the glass granules comprise between about 3.5% and 4.5% thereof by weight.

The preferred superplasticizer used in the lightweight dry mixture is marketed under the name MELMENT F10 by BASF Construction Polymer GmbH (BASF) located in the Federal Republic of Germany. MEMENT is a federally registered trademark owned by BASF. The percentage of the superplasticizer preferably employed in the lightweight embodiment of the dry mixture is between about 0.05% and 0.06% thereof by weight. Most preferably, the formulation of the dry mixture for the lightweight embodiment is as follows:

| | |
|---|---|
| Portland Cement | 45.0% |
| Dolomite/Limestone | 36.65% |
| Redispersible dry polymer | 3.25% |

-continued

| | |
|---|---|
| Perlite | 11.0% |
| Glass Granules | 4.0% |
| Superplasticizer | 0.055% |
| Total | 100% |

Thus, in a 35-pound bag of the lightweight dry mixture, the dolomite or limestone weighs about 12.74 pounds, the cement weighs about 15.75 pounds, the redispersible dry polymer weighs about 1.23 pounds, the perlite about 3.85 pounds, the glass granules about 1.42 pounds and the superplasticizer about 0.02 pounds.

In use, the dry mixtures of both the standard and modified lightweight embodiments of the present invention are preferably premixed and bagged. All of the ingredients are typically added together in a batch mix, blended for several minutes, typically about 20-25 minutes, and then sampled for quality control to ensure an even distribution of ingredients. The dry mixture is then bagged for subsequent use. Typically, a bag of the standard dry mixture of the present invention would weight about 50 pounds and a bag of the lightweight dry mixture would weigh about 35 pounds as the lightweight mixture is 30% lighter than the standard mixture. A 50-pound bag of the standard dry mixture is mixed with about 6.5-7.0 pounds of water to achieve the desired consistency. The 35-pound bag of the lightweight dry mixture is mixed with about 12-13 pounds of water to achieve the desired consistency. The dry mixtures and water are stirred together onsite, preferably using a drill motor, to a "self"-leveling consistency, whereupon the compound is ready for being screeded into place at the desired thickness for its intended purpose.

Prior to cure, a suitable grit or granule, preferably a durable, hard, opaque and processed crushed rock that is free of excessive fines and of a desired color is broadcast onto the wet slope mix until refusal so as to provide the desired texture and color. A suitable grit is provided by A-1 Company located at in Riverside, Calif. 97507.

It is to be understood that various changes and modifications can be made in the present invention without departing from the spirit and scope thereof. For example, the exact nature and granule sizes of the particulate ingredients, and the percentages of the various ingredients can be varied as can the sources of the ingredients. While preferred embodiments of the present invention are described above, the invention is not limited to that specific embodiment or the exact percentages by weight recited therein. The product sources and percentages identified above, however, have been found to provide highly suitable ingredients for use in the present invention.

Although the present invention has been described by way of exemplary embodiments, it should be understood that many changes and substitutions may be made by those skilled in the art without departing from the spirit and the scope of the present invention, which is defined by the appended claims.

What is claimed is:

1. A roof sloping compound comprised of a dry mixture of aggregate, cement and redispersible dry polymer adapted to be mixed with water to define a substantially self-leveling consistency enabling the compound to be readily screeded into place in a desired thickness wherein said aggregate is comprised of dolomite or limestone and comprises between about 55 to 60 percent of said dry mixture by weight, and said redispersible dry polymer comprises a binder based on a copolymer of ethylene vinyl acetate and comprises between 3.5 and 4.5 percent of said dry mixture by weight and wherein said cement comprises between about 35 and 40 percent of said dry mixture by weight.

2. The compound of claim 1 wherein said dolomite or limestone has a granule size of 20 mesh or less.

3. A roof sloping compound comprised of a dry mixture of aggregate, cement a redispersible dry polymer and a superplasticizer adapted to be mixed with water to define a substantially self-leveling consistency enabling the compound to be readily screeded into place in a desired thickness.

4. The compound of claim 3 wherein said aggregate comprises dolomite or limestone and lightweight fillers, said lightweight fillers being comprised of perlite and low density glass granules.

5. The compound of claim 3 wherein said dry aggregate is comprised of dolomite or limestone and said redispersible dry polymer comprises a binder based on a copolymer of ethylene vinyl acetate.

6. The compound of claim 4 wherein said perlite comprises between about 10 and 12 percent of said dry mixture by weight and said glass granules comprise between about 3.5 and 4.5 percent of said dry mixture by weight.

7. The compound of claim 4 wherein said dolomite or limestone in said aggregate comprises between about 32 and 38 percent of said dry mixture by weight, said perlite comprises between about 10 and 12 percent of said dry mixture by weight, said glass granules comprise between about 3.5 and 4.5 percent of said dry mixture by weight, said cement comprises between about 40 and 50 percent of said dry mixture by weight, and said superplasticizer comprises between about 0.05 and 0.06 percent of said mixture by weight.

8. The compound of claim 7 wherein said dolomite or limestone has a granule size of 20 mesh or less.

9. The compound of claim 7 wherein said redispersible dry polymer comprises a binder based on a copolymer of ethylene vinyl acetate.

10. The compound of claim 8 wherein said redispersible dry polymer comprises a binder based on a copolymer of ethylene vinyl acetate.

* * * * *